United States Patent
Peng et al.

(10) Patent No.: US 8,306,131 B2
(45) Date of Patent: Nov. 6, 2012

(54) COMMUNICATIONS SYSTEMS

(75) Inventors: Ying Peng, Bristol (GB); Simon Armour, Bath (GB); Joe McGeehan, Wiltshire (GB); Tomoyoshi Yokota, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1063 days.

(21) Appl. No.: 11/817,001

(22) PCT Filed: Feb. 25, 2005

(86) PCT No.: PCT/JP2005/003666
§ 371 (c)(1),
(2), (4) Date: Aug. 23, 2007

(87) PCT Pub. No.: WO2006/090486
PCT Pub. Date: Aug. 31, 2006

(65) Prior Publication Data
US 2009/0034456 A1    Feb. 5, 2009

(51) Int. Cl.
*H04K 1/10* (2006.01)
(52) U.S. Cl. ........ 375/260; 375/267; 370/208; 370/210; 370/329; 370/332; 370/333
(58) Field of Classification Search .................. 375/260, 375/267; 370/230, 328–330, 335, 343
See application file for complete search history.

(56) References Cited

U.S. PATENT DOCUMENTS

| | | | |
|---|---|---|---|
| 7,680,199 B2* | 3/2010 | Armour et al. | 375/260 |
| 8,023,523 B2* | 9/2011 | Peng et al. | 370/430 |
| 2001/0024427 A1 | 9/2001 | Suzuki | |
| 2003/0072379 A1 | 4/2003 | Ketchum | |
| 2003/0112880 A1 | 6/2003 | Walton et al. | |
| 2003/0125040 A1 | 7/2003 | Walton et al. | |
| 2005/0180515 A1 | 8/2005 | Orihashi et al. | |
| 2006/0089102 A1 | 4/2006 | Nishio et al. | |
| 2009/0104877 A1 | 4/2009 | Nishio et al. | |

FOREIGN PATENT DOCUMENTS

| | | |
|---|---|---|
| JP | 11-205205 | 7/1999 |
| JP | 2000-209145 | 7/2000 |
| JP | 2001238269 A | 8/2001 |
| JP | 2002-261727 | 9/2002 |

(Continued)

OTHER PUBLICATIONS

Cheong Yui Wong; Tsui, C. Y.; Cheng, R. S.; Letaief, K. B.; "A real-time sub-carrier allocation scheme for multiple access downlink OFDM transmission," IEEE Vehicular Technology Conference, 1999. VTC 1999—Fall. IEEE VTS 50th, vol. 2, Sep. 19-22, 1999 pp. 1124-1128 vol. 2.*

(Continued)

*Primary Examiner* — David Ometz
*Assistant Examiner* — Eboni Hughes
(74) *Attorney, Agent, or Firm* — DLA Piper LLP (US)

(57) ABSTRACT

In a multi user communication system, subcarriers are allocated to subchannels using a quality measurement for each subchannel. An initial sub carrier is allocated to each subchannel, and a quality metric measured. Subsequent subcarriers are allocated in dependence upon the quality measurement for each subchannel. The subchannel with the lowest quality measurement receives the first allocation, and the subchannel with the highest quality measurement receives the last allocation. The subsequent allocation is repeated, following a re-sort of the subchannel quality measurements, until all of the subcarriers are allocated.

67 Claims, 6 Drawing Sheets

FOREIGN PATENT DOCUMENTS

| | | |
|---|---|---|
| JP | 2003-032226 | 1/2003 |
| JP | 200303226 A | 1/2003 |
| JP | 2003530010 A | 10/2003 |
| JP | 2004-040232 | 2/2004 |
| JP | 2004-135305 | 4/2004 |
| JP | 2004159302 A | 6/2004 |
| JP | 2004208234 A | 7/2004 |
| WO | 0176110 A2 | 10/2001 |
| WO | 03041300 A1 | 5/2003 |

OTHER PUBLICATIONS

Wonjong Rhee, W.; Cioffi, J.M.; "Increase in capacity of multiuser OFDM system using dynamic subchannel allocation," Vehicular Technology Conference Proceedings, 2000. VTC 2000-Spring Tokyo. 2000 IEEE 51st, vol. 2, pp. 1085-1089.*

Lawry Be, Eric Phillip; "Adaptive Techniques for Multiuser OFDM," Thesis, 2001 pp. 1-327.*

Y. Peng and S. Armour, "An investigation of dynamic sub-carrier allocation in OFDMA systems," Vehicular Technology Conference, 2005. VTC 2005-Spring. 2005 IEEE 61st , vol. 3, pp. 1808-1811 vol. 3, May 30-Jun. 1, 2005.*

Korean language office action and its English language translation for corresponding Korean application 20077019239.

Tejera et al., "Joint bit and power loading for MIMO OFDM based on partial channel knowledge" Vehicular Technology Conference, VETECS.2004.1388911, vol. 2, pp. 660-664, May 17, 2004.

Sung et al., "Rate-allocation strategies for closed-loop MIMO-OFDM" Vehicular Technology Conference, VETECF.2003. 1285064, Bol. 1, pp. 483-487, Oct. 6, 2003.

Park et al., "Dynamic subchannel and bit allocation in multiuser MIMO/OFDMA Systems" Vehicular Technology Conference, VETECS.2004.1388957, vol. 2, pp. 884-888, May 17, 2004.

Gan et al., "A feedback reduction algorithm for OFDM based transmit power adaptation" Communications, IEEE International Conference, ICC.2005.1494823, vol. 4, pp. 2616-2620, May 2005.

Jung Min Choi et al: "Adapative Subcarrier, Bit, and Power Allocation Algorithm for MIMO-OFDMA System" Vehicular Technology Conference, 2004, DOI: 10.1109/VETECS.2004.1390567, vol. 3, pp. 1801-1805, May 2004.

Supplementary European search report dated Feb. 7, 2011 for corresponding European application 05710793.0.

Japanese language office action dated Jun. 28, 2011 and its English language translation for corresponding Japanese application 2007540005.

Jiho Jang et al., "Transmit Power Adaptation for Multiuser OFDM Systems", IEEE Journal on Selected Areas in Communications, vol. 21, No. 2, Feb. 2003, pp. 171-178.

Wonjong Rhee et al., Increase in Capacity of Multiuser OFDM System Using Dynamic Subchannel Allocation, Vehicular Technology Conference Proceedings, IEEE 51$^{st}$, vol. 2, May 15-18, 2000, pp. 1085-1089.

* cited by examiner

COMMUNICATIONS SYSTEMS

CROSS REFERENCE TO THE RELATED APPLICATIONS

This application is a national stage of international application No. PCT/JP2005/003666 filed Feb. 25, 2005, the entire contents of which are incorporated by reference.

TECHNICAL FIELD

The present invention relates to communications systems, and, in particular, to dynamic multi-user subcarrier allocation in a coded OFDMA (orthogonal frequency division multiple access) radio frequency communications system.

BACKGROUND ART

In a frequency selective fading channel, different subcarriers will experience different channel gains. In previously-considered OFDM (Orthogonal Frequency Division Multiplex) TDMA (time division multiple access) systems each user transmits on all sub-carriers simultaneously and users share the channel in time. If the channel is perfectly known to the transmitter, a so-called "water-filling" policy (that is, more power when the channel gain is high and less power when the channel gain is low) is known to be optimal in maximizing the data rate. The increase of data rate, by using transmit power allocation in a single user OFDM system, is due to spectral diversity effects.

In OFDMA (Orthogonal Frequency Division Multiplexing Access) systems, users do not share a channel in time but in frequency by transmitting on a (typically mutually exclusive) sub-set of available sub-carriers. A set of sub-carriers may be grouped into a sub-channel with sub-channels allocated to users. Although the water filling principle still applies, the sharing of sub-carriers introduces an additional degree of freedom to the allocation of system resources for multiple access. Accordingly, it is necessary to consider different solutions for the problem of subcarrier and power allocation in an OFDMA, or multi-user OFDM system. It is likely that signals from different users will undergo independent fading because the users are likely not to be in the same location. Therefore, the probability of all the users' signals on the same subcarrier being subject to significant fading is very low. In a multi-user OFDM system, exploiting multi-user diversity can increase the data rate.

In OFDMA, allocating one subcarrier to one user typically prevents other users from using that subcarrier, since it is desirable to avoid the interference that arises when users share the same subcarrier. Hence, the optimal solution is not necessarily to assign the best subcarriers seen by a single chosen user (as in a single user system). This may be the case because, for example, it may happen that the best subcarrier of one user is also the best subcarrier for another user who happens to have no other good subcarriers. Hence, a different approach should be considered.

As stated above, an OFDMA system provides an extra degree of freedom since there are multiple sub-carriers available to be allocated, and it is this property that can be exploited. OFDMA matches well to the multi-user scenario; a subcarrier which is of low quality to one user can be of high quality to another user and can be allocated accordingly. By adaptively assigning sub-carriers, it is possible to take advantage of channel diversity among users in different locations. This "multi-user diversity" stems from channel diversity including independent path loss and fading of users. Previously considered solutions suggested possible subcarrier and power allocation algorithms for OFDMA systems. For example, see W. Rhee, J. M. Cioffi, "Increase in capacity of multi-user OFDM system using dynamic subchannel allocation", Vehicular Technology Conference Proceedings, 2000, IEEE 51$^{st}$, Volume: 2, 15-18 May 2000, Page(s): 1085-1089; and J. Jang, K. Bok Lee, "Transmit Power Adaptation for Multi-user OFDM Systems", IEEE Journal on Selected Areas in Communications, Volume: 21, Issue: 2, February 2003, Page(s): 171-178.

There is an added level of complexity introduced when multiple transmit and/or receiver antenna are used. Such multiple antenna systems are known as MIMO, multiple input multiple output, systems. In all systems, but in multiple antenna system in particular, it is important to consider the communication paths between each transmitter antenna and each receiver antenna. These communication paths will be referred to as "communication links" in the following description in order to avoid confusion with multi path fading effects. A communication link is simply a direct connection between a transmitter antenna and a receiver antenna. For example, in a single antenna system, there is a single communication link between the transmitter and a receiver. In a multi antenna example, with two transmitter antenna per transmitter and two receiver antenna per receiver, there would be four communications links.

Space Time Block Coding (STBC) algorithms have been proposed for two transmitter antennas to provide spatial diversity and increase MIMO capacity. For example, see B. Vucetic, "Space-Time Codes for High Speed Wireless, Communications", King's College, London, November 2001, A. F/Magiob, N. Seshadri, A. R. Calderbank, "Increasing data rate over wireless channels", Signal Processing Magazine Vol.17 No.3, May 2000, pp.76-92, Naofal Al-Dhahir, "A New High-Rate Differential Space-Time Block Coding Scheme", IEEE Communications Letters, Vol. 7, No. 11, November 2003, and Siavash M. Alamouti, "A Simple Transmit Diversity Technique for Wireless Communications", IEEE Journal On Select Areas In Communications, Vol. 16, No. 8, October 1998.

FIG. 1 illustrates channel diversity in a radio frequency telecommunications system. A base station 1 operates to transmit signals to mobile receivers 21 and 22. Obstacles, such as buildings 3, can cause the transmissions between the base station 1 and the mobile users 21 and 22 to take multiple paths 41 and 42. This phenomenon is well known and is known as multipath diversity. The signals arriving at the mobile receivers will vary in gain as a function of frequency, due to the varying lengths of the paths and reflections occurring on those paths. This means that different users receive different gain values for different subcarriers. In FIG. 1, the base station and mobile receivers are shown with a single antenna each for the sake of clarity. It will be readily appreciated, however, that any number of antenna can be used for the transmitter and receiver.

FIG. 2 illustrates a base station suitable for use in a multiple antenna OFDM or OFDMA system. The base station 10 receives data inputs $U_1, U_2 \ldots U_K$ from a plurality of users at an encoder 102. The encoder 102 encodes these user data signals $U_1$ to $U_K$ onto respective sets of subcarriers $C_{1,1}, C_{1,2} \ldots C_{1,N}, C_{2,1}, C_{2,2} \ldots C_{2,N}$. In the example shown in FIG. 2, there are two transmitter antenna, and so the encoding results in two sets of subcarriers being defined.

A controller 108 controls the encoder 102, in order to allocate the sets of subcarriers $C_1$ to $C_N$ to the users $U_1$ to $U_K$. A transmitter transformation unit 104 is provided for each antenna of the transmitter, and operates to take the set subcarrier signals for the associated antenna and apply an inverse fast Fourier transform (IFFT) and a parallel-to-serial conversion to produce a serial output data stream. This data stream is supplied to an output unit 106, one of which is provided for each antenna, and which adds a cyclic prefix and converts the digital signal to analogue for transmission from the associated antenna 20.

The controller 108 receives feedback signals $f_1$ to $f_K$ indicative of the channel subcarrier performance for each user. The controller 108 supplies control signals 110 on a control channel to the mobile receivers.

FIG. 3 illustrates a receiver suitable for use in an OFDM system. Each user has at least one receiving antenna 30 connected to a user receiver 40. The user receiver 40 includes an input unit 402 for each receiver antenna, and this input unit 402 performs analogue-to-digital conversion of the incoming signal from the associated receiver antenna and removes the cyclic prefix which was added by the base station transmitter. The digital signal is then processed by a receiver transformation unit 404 (again one per receiver antenna), which applies a fast Fourier transform (FFT) and serial-to-parallel conversion to produce a set of subcarrier signals $C_1$ to $C_N$ for the antenna concerned. The combination of input unit and transformation unit for each antenna produces a set of subcarrier signals. These sets of subcarrier signals are received by a subcarrier selector 406 which, in dependence on received controlled signals 410, selects the appropriate subcarriers for a given user K. The selected subcarriers are supplied to a decoder 408 which decodes the data signal relating to this user K, to produce an output signal $D_K$ for the user K.

Operation of the base station of FIG. 2 and the receiver of FIG. 3 will now be explained in more detail below.

The controller 108 at the base station 10, having determined channel feedback information from all users, allocates subcarriers to each user according to a subcarrier allocation algorithm. When the CSI (Channel State Information) is available at the transmitter, the transmitter can assign subcarriers to users and also adapt the transmit power in a symbol by symbol (or packet by packet) manner to increase data rate, assuming that the fading characteristics of the channel are constant for the symbol (or packet) duration.

In one previous solution mentioned, Rhee and Cioffi showed that since each subcarrier is assigned to a user whose channel gain is good for that subcarrier, there is no need for different power allocation among the subcarriers. Hence, the algorithm only needs to find the most appropriate subcarriers for all users and allocate equal power; this results in lower implementation complexity.

In the other previous solution mentioned, Jang and Bok Lee propose a transmit power allocation scheme and subcarrier allocation algorithm in the general case where users are allowed to share a subcarrier. In that case, if the transmit power for a specific users' signal is increased, the interference to other users' signals on the same subcarrier is also increased. However, after a mathematical analysis, it was found that the capacity is maximised if a subcarrier is assigned to only one user and hence no interference occurs (something that has become a fundamental assumption for all previous and future work). As with Rhee and Cioffi, it was found that equal power allocation is the best approach since water-filling over the allocated subcarriers will not give any significant gain and will increase computational complexity. In the final proposed scheme, only one user who has the best channel gain for that subcarrier transmits data at that subcarrier (for each subcarrier check which user has the best gain). It was also found that data rate is increased for increased number of users since it provides more multi-user diversity.

Although in the scheme proposed by Jang and Bok Lee the received average SNR for each subcarrier is increased and the average data rate is increased, this algorithm is not fair for the users. The number of subcarriers assigned to each user is not fixed, hence each user can have different data rates. Additionally, if it happens that one user does not have the best channel gain of the multiple users being considered for any of the subcarriers (for example, due to its location) then no subcarriers at all will be allocated to that user.

DISCLOSURE OF THE INVENTION

According to one aspect of the present invention, there is provided A method of allocating subcarriers to subchannels in a telecommunications system which transmits a plurality of subchannels using subcarriers, the method comprising: a) defining a number of spatial channels each of which has a plurality of subchannels associated therewith; for the or each spatial channel: b) allocating an initial subcarrier to each subchannel; c) detecting respective quality measurements for the subchannels; d) allocating a further subcarrier to each of the subchannels associated with the spatial channel, in an order determined by respective quality measurements of the subchannels; e) repeating steps c) and d) until all subcarriers are allocated.

According to another aspect of the present invention, there is provided a telecommunications system comprising: a transmitter terminal operable to transmit signals to at least one receiver terminal, the signals being transmitted on subchannels to which subcarriers are allocated; at least one receiver terminal operable to receive a subchannel communication from the transmitter terminal; and an allocation unit operable to allocate subcarriers to subchannels, and to allocate subchannels to receiver terminals, wherein the allocation unit is operable to: a) define a number of spatial channels each of which has a plurality of subchannels associated therewith; for the or each spatial channel: b) allocate an initial subcarrier to each subchannel; c) detect respective quality measurements for the subchannels; d) allocate a further subcarrier to each of the subchannels associated with the spatial channel, in an order determined by respective quality measurements of the subchannels; and e) repeat detection of quality measurements and subsequent allocation of subcarriers until all subcarriers are allocated.

According to another aspect of the present invention, there is provided a transmitter terminal for a telecommunications system, the terminal comprising: a transmitting unit operable to transmit signals to at least one receiver terminal on subchannels to which subcarriers are allocated; and an allocation unit operable to allocate subcarriers to subchannels, and to allocate subchannels to receiver terminals, wherein the allocation unit is operable to: a) define a number of spatial channels each of which has a plurality of subchannels associated therewith; for the or each spatial channel: b) allocate an initial subcarrier to each subchannel; c) detect respective quality measurements for the subchannels; d) allocate a further subcarrier to each of the subchannels associated with the spatial channel, in an order determined by respective quality measurements of the subchannels; and e) repeat detection of quality measurements and subsequent allocation of subcarriers until all subcarriers are allocated.

It will be readily appreciated that methods embodying the present invention are particularly applicable to radio frequency telecommunications systems. It will also be readily apparent that the principles of the present invention may be applied to other communication systems that employ other communication techniques.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a claim enumerating several means, several of these means may be embodied by one and the same item of hardware. The mere fact that certain measures are recited in mutually different dependent claims does not indicate that a combination of these measures cannot be used to advantage.

BEST MODE FOR CARRYING OUT THE INVENTION

In an OFDM or OFDMA system, in the presence of multipath diversity, all subcarriers will arrive at a given receiver with different amplitudes. In fact, some subcarriers may be completely lost because of significant fading effects. Hence, the overall bit rate and capacity will be dominated by the few subcarriers with the smallest amplitudes (even though most subcarriers may be detected without errors).

In order to attempt to counteract this disadvantage, most OFDM or OFDMA systems employ channel coding. Using coding across the subcarriers, enables errors of weak subcarriers to be corrected. The performance of the coded OFDM/OFDMA system can be determined by the average received power rather than the power of the weakest subcarrier.

Figure 1:
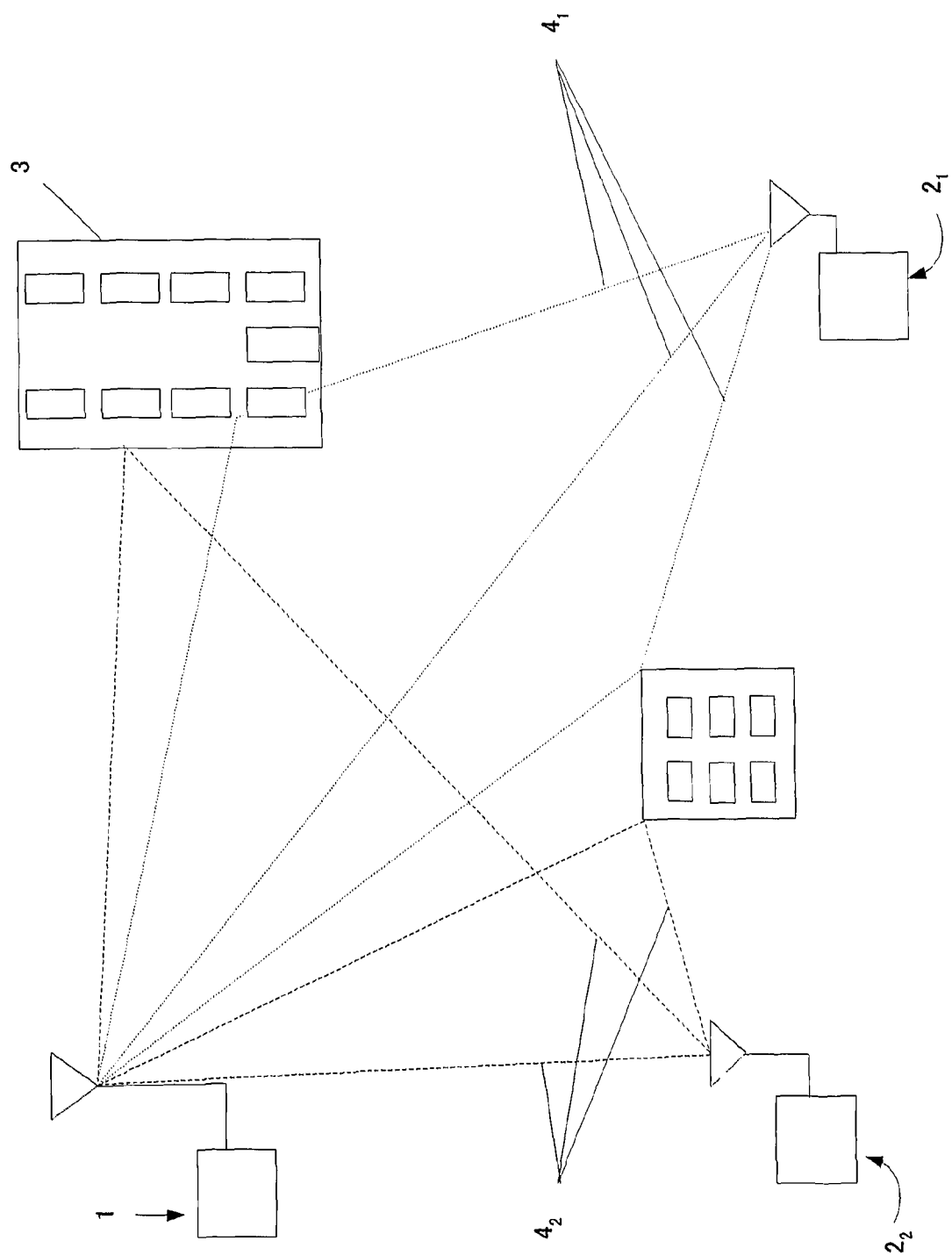
FIG. 1 illustrates multipath diversity in a radio telecommunications system.
Figure 2:
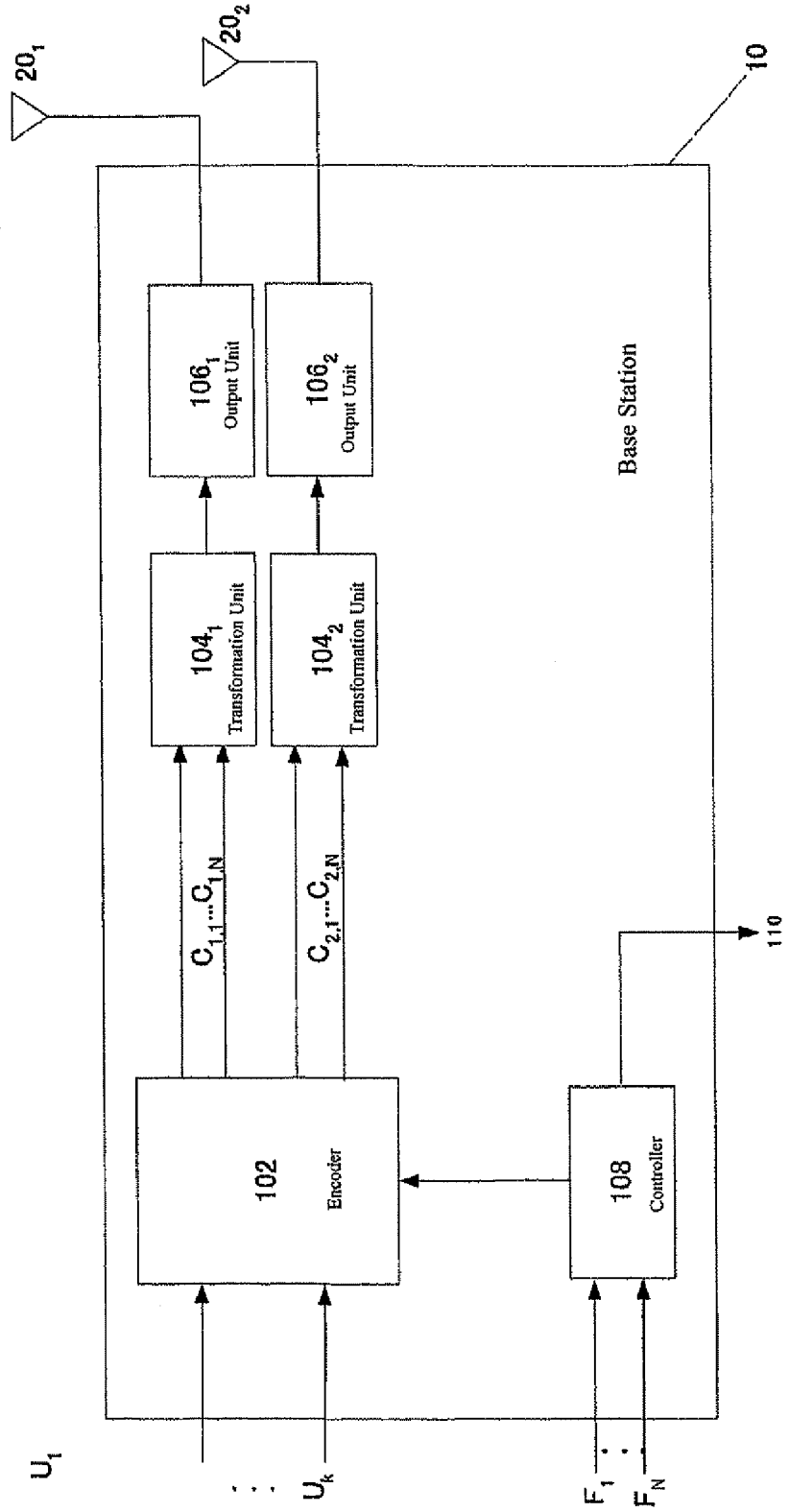
FIG. 2 is a block diagram illustrating a base station transmitter for use in an OFDM radio telecommunications system.
Figure 3:
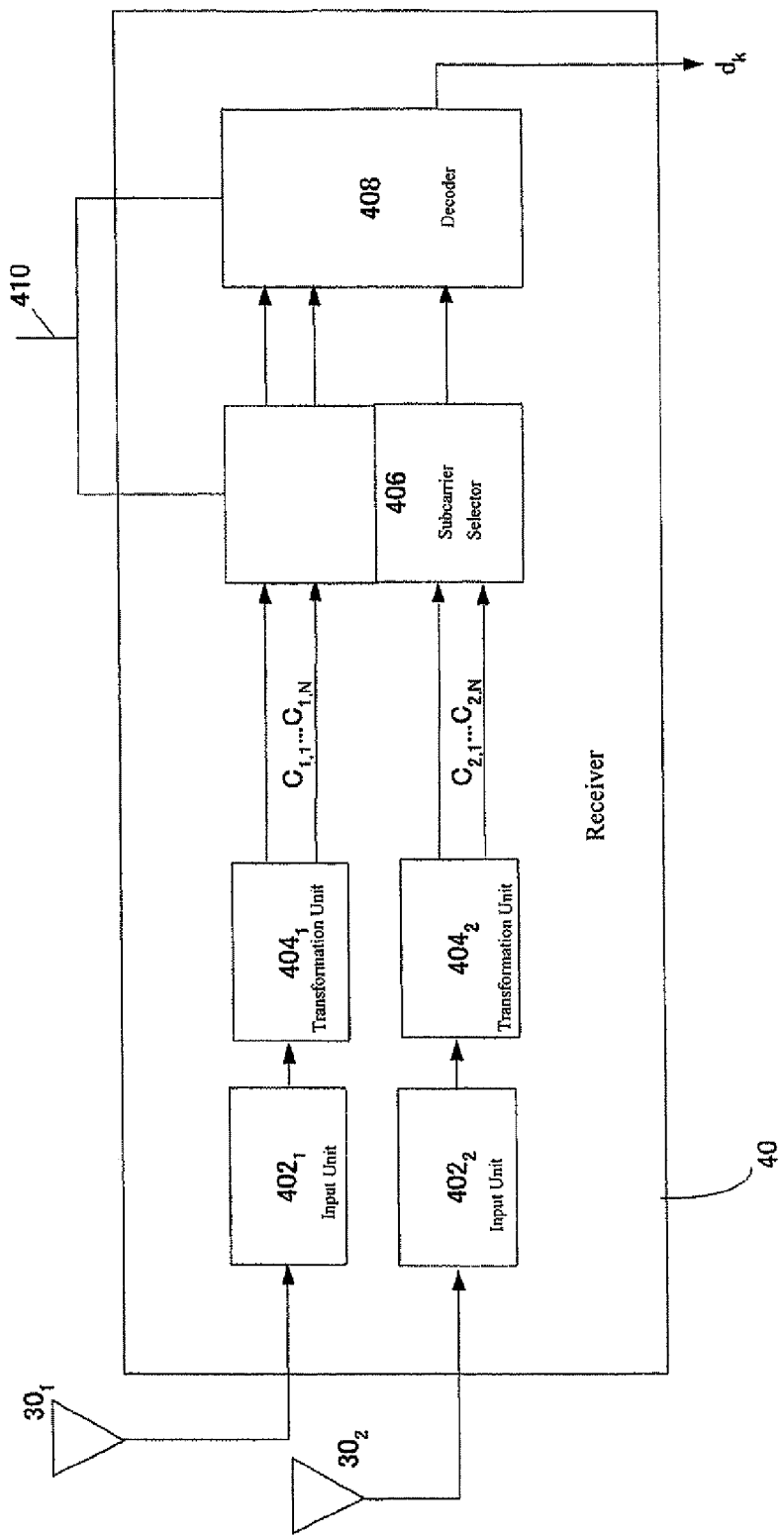
FIG. 3 is a block diagram illustrating a receiver for use in an OFDM radio communications system.
Figure 4:
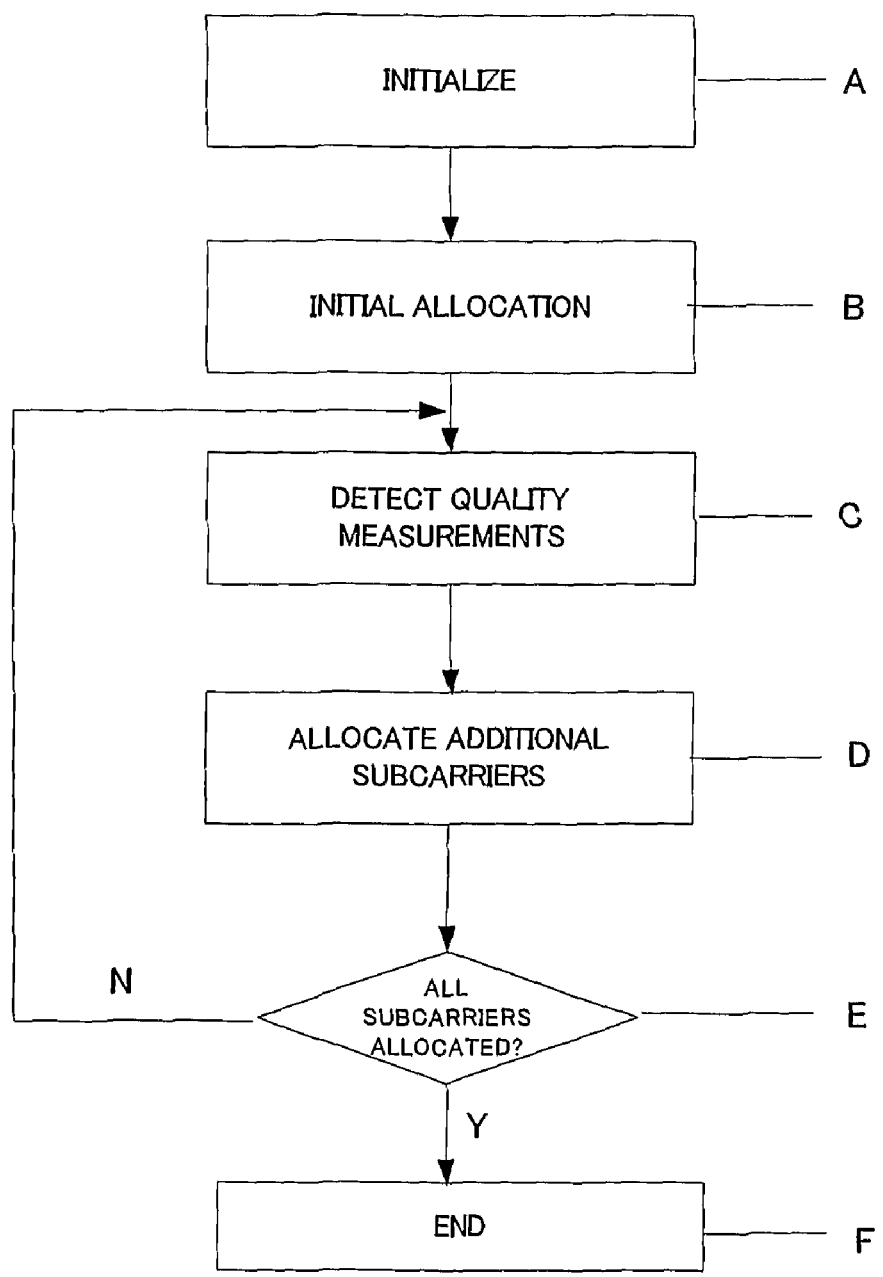
FIG. 4 is a flow chart illustrating steps in a first method embodying the present invention.

FIG. 4 is a flow chart illustrating a first method embodying the present invention. In this first method, it is assumed that the transmitter and receiver have a single antenna each.

The method starts (at step A) by initialising data relating to a subchannel quality measurement. For example, the initial level of the quality measurement can be set to zero. At step B, respective initial subcarriers are found for each subchannel. Each initial subcarrier is found to find the best subcarrier gain for that user. The quality measurement is updated (step C) to reflect the allocated subcarriers, and once a subcarrier is allocated it is no longer available for allocation to another subchannel. At step D, additional subcarriers are allocated to the subchannels in an order of the subchannels determined by the quality measurements for the subchannels. For example, where the power level of the subchannel is used as the quality measurement, the allocation can be made is ascending order of subchannel power level. When it is determined that all subcarriers are allocated (step E) then the process ends (step F) until the next channel change. If all subcarriers have not been allocated then steps C, D and Z are repeated until all of the subcarriers are allocated.

In the following description, $P_k$ represents the average received power for subchannel (user) k. N represents the usable subcarriers. $H_{k,n}$ represents the channel gain for subcarrier n and user k. In the following example, the number of subchannels (users) is 16, the number of subcarriers is 768 and for the sake of simplicity it is assumed that each user is allocated one subchannel only. Note that multiple subchannels may be allocated to particular users to give them a larger share of the available resources whilst maintaining a fair allocation of resources between subchannels. It will be readily appreciated that techniques embodying the invention can be applied to any number of users and subcarriers.

The first method described above can be expressed algorithmically as follows ($P_k$ is the quality measurement for user k):

1. Initialisation (Step A)
    Set $P_k=0$ for all subchannels k=1 to K, [N={1,2,3 . . . , 768} (available subcarriers)
2. First Time (Step B)
    For every subchannel k=1 to K
    a) Find subcarrier n satisfying $|h_{k,n}|>=|h_{k,j}|$ for all j∈N
    b) Update $P_k$ and N with the n from a) according to:

$P_k=P_k+|h_{k,n}|^2, N=N-\{n\}$ remove this subcarrier from the available subcarriers
3. While N<>0 (ie. until all subcarriers are allocated)
    a) Sort subchannels according to the subchannel quality measurement (step C).
    b) For the found subchannel k, find (step D) subcarrier n satisfying:

$|h_{k,n}|>=|h_{k,j}|$ for all j∈N c) Update $P_k$ and N with the n from a) according to:

$P_k=P_k+|h_{k,n}|^2, N=N-\{n\}$ d) Go (step E) to the next subchannel in the short list, until all subchannels are allocated another subcarrier.

In the algorithm above, and in the other algorithms described below, $P_k$ represents the quality measurement for subchannel K, N represents the available subcarriers, $h_{k,n}$ represents subcarrier quality for user k for subcarrier n.

The method described in relation to the flow chart of FIG. 4 is for the single antenna case, and so it is desirable to extend the technique to accommodate the multiple antenna case. Accordingly, reference will now be made to FIG. 5, which illustrates a second method embodying the present invention. This second method is applicable to a system with any number of antennas.

The second method uses the same algorithm as the first method, but repeats the algorithm multiple times. In the second method, a number of "spatial channels" is defined—the calculation of this number will be described below. Each spatial channel includes all of the subchannels, and is used to generate allocations of subcarriers for all of those subchannels. The algorithm is repeated for each of the defined spatial channels in order that all subchannels are allocated subcarriers in all of the spatial channels.

The number of spatial channels can be chosen arbitrarily, or can be related to the number of antennas used in the telecommunications system. For example, the number of spatial channels can equal the number of transmitter antennas, or equal the number of receiver antennas, or be equal to the lesser of the number of transmitter antennas and the number of the receiver antennas. Alternatively, the number of spatial channels may be equal to the product of the number of the transmitter antenna and the receiver antennas. The number of spatial channels is determined in advance of the allocation method to be described below.

It will be readily appreciated that the first method is a special case of the second method, where the number of spatial channels equals one.

Figure 5:
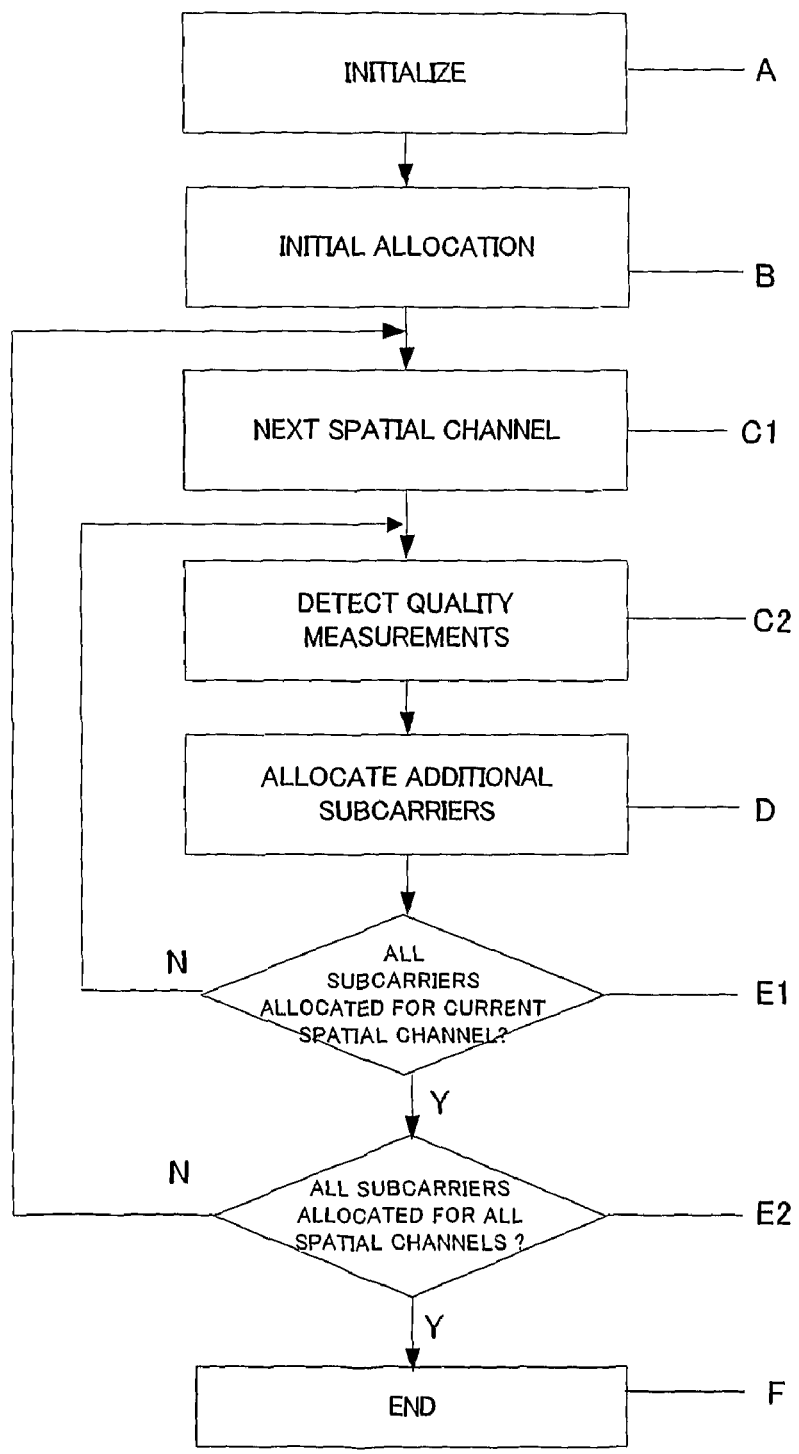
FIG. 5 is a flow chart illustrating steps in a second method embodying the present invention.

The method of FIG. 5 starts (at step A) by initialising data relating to a subchannel quality measurement. For example, the initial level of the quality measurement can be set to zero. At step B, respective initial subcarriers are found for each subchannel for a first spatial channel. Each initial subcarrier is found to give the best subcarrier gain for the subchannel concerned for the spatial channel concerned. In step C1, the process is moved to the next defined spatial channel, and at step C2, the quality measurements are updated to reflect the allocated subcarriers. Again, once a subcarrier is allocated it is no longer available for allocation to another subchannel for that spatial channel.

At step D, an additional subcarrier is allocated to the subchannels for the current spatial channel, in dependence upon the order of the subchannels determined by the quality measurements for the subchannels. For example, where the power level of the subchannel is used as the quality measurement, the allocation can be made is ascending order of subchannel power level. When it is determined that all subcarriers are allocated (step E1) for the current spatial channel, the process moves to determine (step E2) whether all subcarriers have been allocated for all spatial channels. If so, then the process ends (step F) until the next channel change. If all subcarriers have not been allocated for the current spatial channel, then steps C2, D and E1 are repeated until all of the subcarriers are allocated for the current spatial channel.

When subcarriers have been allocated for the current spatial channel, step E2 causes the process to move back to step C1, where the next spatial channel is selected, such that steps C2, D and E1 allocate the subcarriers to that next spatial channel.

The second method can be described algorithmically for the case where the number of spatial channels equals the product of the number of transmitter antennas and the number of receiver antennas:

```
{
For m = 1 to M (M = T_x × R_x),
{
1. Initialisation (step A)
Set P_k = 0 for all users k = 1 to K, N_m = {1, 2, 3 ..., 768},
m = {1, 2 ... M = Tx × Rx}
Set C_{t, k, s, m} = 0 for all users k = 1 to 16, N_m = {1, 2, 3 ..., 768},
m = {1, 2 ... M}
Set s = 1
II. Main process
1. First time (step B)
    For k = 1 to K
    {
    (a) Find subcarrier n satisfying |h_{k, n, m}| ≧ |h_{k, j, m}| for all j ∈ N
    (b) Update P_k, N_m, C_{t, k, s} with the n from (a)
```

$$P_k = P_k + \sum_{m=1}^{M} |h_{k,n,m}|^2$$

```
    N_m = N_m − {n}
    C_{t, k, 1} = n
    s = s + 1
    }
```

-continued

```
2. While N_m ≠ 0
{
    (a) Make a sorted list according to the subchannels' quality
    measurements (step C2)
        Find subchannel k satisfying
        P_k ≦ P_i for all i, 1 ≦ i ≦ k
    (b) For the subchannel k, Find (step D) subcarrier n satisfying
    |h_{k, n, m}| ≧ |h_{k, j, m}| for all j ∈ N
    (c) Update P_k, N_m and C_{t, k, s} with the n from (b) according to
```

$$P_k = P_k + \sum_{m=1}^{M} |h_{k,n,m}|^2$$

```
    N_m = N_m − {n}
    C_{t, k, s} = n
    s = s + 1
    (d) go to the next subchannel in the sorted list until all subchannels
    are allocated another subcarrier (step E1).
}
Go to the next spatial channel m, until m = M. (step E2)
}
```

For multiple antenna applications, the quality measurement can be taken for a single spatial channel, for a selection of the spatial channels, or across all spatial channels.

Figure 6:
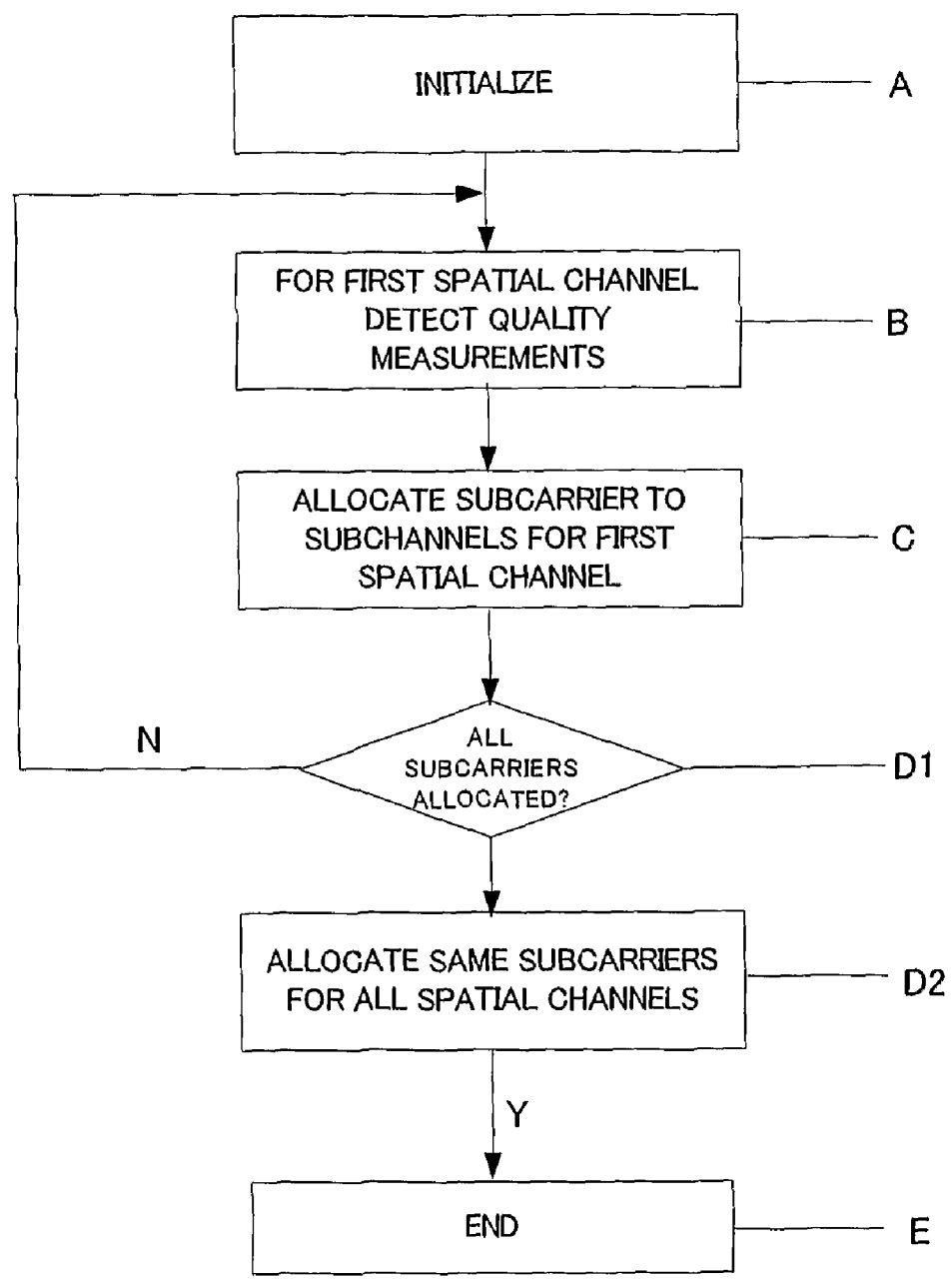
FIG. 6 is a flow chart illustrating steps in a third method embodying the present invention.

FIG. 6 illustrates a third method embodying the present invention. The third method starts with initialisation of the quality measurements, as before. In the third method, the process then proceeds directly to steps C in which quality measurements are detected for a first spatial channel. In step D, a subcarrier is allocated to a sub channel for the first spatial channel, and in step E1 a check is made to determine whether all subcarriers have been allocated for the first spatial channel. If this is not the case, then the process returns and repeats steps C and D until all subcarriers are allocated for the first spatial channel.

At step E2, the allocation of subcarriers arrived at for the first channel is applied to the remaining spatial channels, before the process ends at step F.

In one particular example of the third method, the quality measurement for a subchannel is related to the maximum channel gain for the subchannel concerned across all of the spatial channels. In another example of the third method, the quality measurement for a subchannel is related to the average channel gain for the subchannel concerned across all of the spatial channels. Alternatively, the quality measurement can relate to a sum of the spatial channel gains for the subchannel concerned.

The third method, using the maximum power constraint, can be described algorithmically as follows for the case where the number of spatial channels equals the product of the number of transmitter antennas and the number of receiver antennas:

```
1. Initialisation (step A)
Set P_k = 0 for all users k = 1 to 16, N_m = {1, 2, 3 ..., 768},
m = {1, 2 ... M = Tx × Rx}
Set C_{t, k, s} = 0 for all users k = 1 to 16, N_m = {1, 2, 3 ..., 768},
m = {1, 2 ... M}
Set s = 1
II. Main process
1. First time (step B)
    For k = 1 to K
    {
        (a) For m = 1 to M
        Find subcarrier n for all M = T_x × R_x spatial channels
satisfying:
        |h_{k, n_1, 1}| ≧ |h_{k, j_1, 1}|      For all j_1 ∈ N
        |h_{k, n_2, 2}| ≧ |h_{k, j_2, 2}|      For all j_2 ∈ N
```

-continued $|h_{k, n_3, 3}| \geq |h_{k, j_3, 3}|$     For all $j_3 \in N$
$|h_{k, n_4, 4}| \geq |h_{k, j_4, 4}|$     For all $j_4 \in N$
(b) Find the maximum value among the values obtained in (a)
$h_{k, n, m} = \max(|h_{k, n_1, 1}|, |h_{k, n_2, 2}|, |h_{k, n_3, 3}|, |h_{k, n_4, 4}|)$
(c) Update $P_k$, $N_m$, $C_{t, k, s}$ with the n from (b)

$$P_k = P_k + \sum_{m=1}^{M} |h_{k,n,m}|^2$$

$N_m = N_m - \{n\}$
$C_{t, k, 1} = n$
$c = s + 1$
}
2. While $N_m \neq 0$
{
    (a) Make a sorted list according to the subchannels' quality measurements (step C)
       Find subchannel k satisfying
          $P_k \leq P_i$ for all $i$, $1 \leq i \leq k$
    (b) For the k obtained in (a)
       For m = 1 to M
       Find (step D) subcarrier n for all $M = T_x \times r_x$ spatial channels satisfying:
$|h_{k, n_1, 1}| \geq |h_{k, j_1, 1}|$     For all $j_1 \in N$
$|h_{k, n_2, 2}| \geq |h_{k, j_2, 2}|$     For all $j_2 \in N$
$|h_{k, n_3, 3}| \geq |h_{k, j_3, 3}|$     For all $j_3 \in N$
$|h_{k, n_4, 4}| \geq |h_{k, j_4, 4}|$     For all $j_4 \in N$
(c) Find the maximum value among the values obtained in (a)
$h_{k, n, m} = \max(|h_{k, n_1, 1}|, |h_{k, n_2, 2}|, |h_{k, n_3, 3}|, |h_{k, n_4, 4}|)$
(d) Update $P_k$, $N_m$ and $C_{t, k, s}$ with the n from (c) according to $$P_k = P_k + \sum_{m=1}^{M} |h_{k,n,m}|^2$$

$N_m = N_m - \{n\}$
$C_{t, k, s} = n$
$s = s + 1$
(e) go to the next user in the sorted list obtained in (a) until all users are allocated
         another sub-carrier (step E).

The third method, using the average power level measurement, can be described as follows for the case where the number of spatial channels equals the product of the number of transmitter antennas and the number of receiver antennas:

1. Initialisation (step A)
Set $P_k = 0$ for all users k = 1 to 16, $N_m = \{1, 2, 3 \ldots, 768\}$,
m = $\{1, 2 \ldots M = Tx \times Rx\}$
Set $C_{t, k, s} = 0$ for all users k = 1 to 16, $N_m = \{1, 2, 3 \ldots, 768\}$,
m = $\{1, 2 \ldots M\}$
Set s = 1
II. Main process
1. First time (step B)
    For k = 1 to K
    {

(a) $h\_ave_{k,n} = \sum_{m=1}^{M} |h_{k,n,m}|$ for all $n \in N_m$ (b) Find sub-carrier n satisfying
          $|h\_ave_{k,n}| \geq |h\_ave_{k,j}|$ for all $j \in N_m$
       (c) Update $P_k$, $N_m$ and $C_{t, k, s}$ with the n from (b) according to $$P_k = P_k + \sum_{m=1}^{M} |h_{k,n,m}|^2$$

$N_m = N_m - \{n\}$
$C_{t, k, 1} = n$
$s = s + 1$
}

2. While $N_m \neq 0$
{
    (a) Make a sorted list according to the subchannels' quality measurement (step C)
       Find user k satisfying
          $P_k \leq P_i$ for all $i$, $1 \leq i \leq k$
    (b) According the k obtained in (a)

$$h\_ave_{k,n} = \sum_{m=1}^{M} |h_{k,n,m}| \text{ for all } n \in N_m$$

(c) For the user k found in (a), find sub-carrier n satisfying
          $|h\_ave_{k, n}| \geq |h\_ave_{k, j}|$ for all $j \in N_m$
    (d) Update $P_k$, $N_m$ and $C_{t, k, s}$ with the n from (c) according to $$P_k = P_k + \sum_{m=1}^{M} |h_{k,n,m}|^2$$

$N_m = N_m - \{n\}$
$C_{t, k, s} = n$
$s = s + 1$ (e) go to the next subchannel in the sorted list obtained in
       (a) until all subchannels are allocated another subcarrier.

Although the invention is described with reference to a radio telecommunications system, it will be readily appreciated that the techniques and principles of the invention are applicable to other systems.

It will be readily appreciated that the allocation of subcarriers to subchannels, in accordance with any of the methods described above, can be carried out by a transmitter terminal of the telecommunications system. Alternatively, the allocation can be performed by one or more of the receiver terminals of the system. As further alternatives, the allocation can be performed by a separate allocation unit, or the allocation process can be distributed across multiple terminals of the system.

Since the algorithms described above are deterministic, if all of the terminals have access to the same information on the channel, they could all implement the algorithm with the same result. In such a system, it is necessary that all of the terminals are provided with the relevant information concerning the channel, and this is particularly the case in those networks which use distributed control, with no base station. The information can be provided to each of the user terminals using the control channels available in the system.

Although power level is used as the quality measurement in the described embodiments, it will be readily appreciated that the present invention is applicable to any quality measurement. For example, power level, or SINR (signal to Interference and Noise Ratio) could be used as a quality measurement as a basis for the allocation of subcarriers. Other quality measurements can also be used.

The invention claimed is:

1. A method of allocating subcarriers to subchannels in a telecommunications system which transmits a plurality of subchannels using subcarriers, the method comprising:
    a) defining a number of spatial channels each of which has a plurality of subchannels associated therewith;
    for each spatial channel:
    b) allocating a set of initial subcarriers among the subcarriers to each subchannel when a subchannnel quality measurement is initialized to zero, wherein the set of initial subcarriers is allocated to give a best subcarrier gain for each subchannel, and wherein the allocated subcarriers are no longer available for allocation to another subchannel and the set of initial subcarriers is less than all the subcarriers;

c) after allocating the initial subcarriers to each subchannel in step b), detecting respective quality measurements for the subchannels;

d) allocating a further set of unallocated subcarriers among the subcarriers to each of the subchannels associated with the spatial channel, in an order determined by the detected respective quality measurements of the subchannels;

e) repeating steps c) and d) until all the subcarriers are allocated.

2. A method as claimed in claim 1, wherein the telecommunications system includes at least one transmitter antenna, and the number of spatial channels is related to the number of transmitter antennas.

3. A method as claimed in claim 2, wherein the number of spatial channels equals the number of transmitter antennas.

4. A method as claimed in claim 1, wherein the telecommunications system includes at least one receiver antenna, and the number of spatial channels is related to the number of receiver antennas.

5. A method as claimed in claim 4, wherein the number of spatial channels equals the number of receiver antennas.

6. A method as claimed in claim 1, wherein the telecommunications system includes respective pluralities of transmit and receiver antennas.

7. A method as claimed in claim 6, wherein the number of spatial channels equals the lesser of the number of transmitter antennas and the number of receiver antennas.

8. A method as claimed in claim 6, wherein the number of spatial channels equals the product of the number of transmitter antennas and the number of receiver antennas.

9. A method as claimed in claim 1, wherein the step of detecting respective quality measurements comprises detecting quality measurements for each subchannel across a subset of the plurality of spatial channels.

10. A method as claimed in claim 1, wherein the step of detecting respective quality measurements comprises detecting quality measurements for each subchannel across all of the spatial channels.

11. A method as claimed in claim 1, wherein the step of detecting respective quality measurements comprises detecting quality measurements for each subchannel for a preselected one of the spatial channels.

12. A method as claimed in claim 1, wherein the subcarriers allocated to a subchannel are the same for all spatial channels.

13. A method as claimed in claim 12, wherein the quality measurement for a subchannel is related to the maximum channel gain for the subchannel concerned across all of the spatial channels.

14. A method as claimed in claim 12, wherein the quality measurement for a subchannel is related to an average channel gain for the subchannel concerned across all of the spatial channels.

15. A method as claimed in claim 1, wherein the step of detecting respective quality measurements for the subchannels includes receiving feedback data indicative of subchannel quality measurements.

16. A method as claimed in claim 1, wherein the telecommunications system is a wireless communications system.

17. A method as claimed in claim 1, wherein the telecommunications system is a radio frequency telecommunications system.

18. A method as claimed in claim 17, wherein the radio frequency telecommunications system is an orthogonal frequency division multiple access OFDMA system.

19. A method as claimed in claim 1, wherein the allocation is performed by transmitter terminal of the telecommunications system.

20. A method as claimed in claim 1, wherein the allocation is performed by at least one receiver terminal of the telecommunications system.

21. A method as claimed in claim 1, wherein the quality measurement is a power level measurement.

22. A method as claimed in claim 1, wherein the quality measurement is a SINR (Signal to Interference and Noise Ratio).

23. A method of transmitting data from a transmitter terminal to at least one receiver terminal in a telecommunications system employing a plurality of subcarriers at respective subcarrier frequencies, the method comprising:

allocating subcarriers to each of a plurality of subchannels;

allocating at least one subchannel to the or each receiver terminal;

transmitting data from the transmitter terminal to the or each receiver terminal on respective subchannels allocated to the or each receiver terminal, wherein the step of allocating subcarriers to each of a plurality of subchannels uses a method as claimed in claim 1.

24. A telecommunications system comprising:

a transmitter terminal operable to transmit signals to at least one receiver terminal, the signals being transmitted on subchannels to which subcarriers are allocated;

at least one receiver terminal operable to receive a subchannel communication from the transmitter terminal; and an allocation unit operable to allocate subcarriers to subchannels, and to allocate subchannels to receiver terminals, wherein the allocation unit is operable to:

a) define a number of spatial channels each of which has a plurality of subchannels associated therewith;

for each spatial channel:

b) allocate a set of initial subcarriers among the subcarriers to each subchannel when a subchannnel quality measurement is initialized to zero, wherein the set of initial subcarriers is allocated to give a best subcarrier gain for each subchannel, and wherein the allocated subcarriers are no longer available for allocation to another subchannel and the set of initial subcarriers is less than all the subcarriers;

c) after allocating the initial subcarriers to each subchannel in step b), detect respective quality measurements for the subchannels;

d) allocate a further set of unallocated subcarriers among the subcarriers to each of the subchannels associated with the spatial channel, in an order determined by the detected respective quality measurements of the subchannels; and e) repeat detection of quality measurements and subsequent allocation of subcarriers until all the subcarriers are allocated.

25. A system as claimed in claim 24, comprising at least one transmitter antenna, and wherein the number of spatial channels is related to the number of transmitter antennas.

26. A system as claimed in claim 25, wherein the number of spatial channels equals the number of transmitter antennas.

27. A system as claimed in claim 24, comprising at least one receiver antenna, and wherein the number of spatial channels is related to the number of receiver antennas.

28. A system as claimed in claim 27, wherein the number of spatial channels equals the number of receiver antennas.

29. A system as claimed in claim 24, comprising respective pluralities of transmit and receiver antennas.

30. A system as claimed in claim 29, wherein the number of spatial channels equals the lesser of the number of transmitter antennas and the number of receiver antennas.

31. A system as claimed in claim 29, wherein the number of spatial channels equals the product of the number of transmitter antennas and the number of receiver antennas.

32. A system as claimed in claim 24, wherein the allocation unit is operable to detect quality measurements for each subchannel across a subset of the plurality of spatial channels.

33. A system as claimed in claim 24, wherein the allocation unit is operable to detect quality measurements for each subchannel across all of the spatial channels.

34. A system as claimed in claim 24, wherein the allocation unit is operable to detect quality measurements for each subchannel for a preselected one of the spatial channels.

35. A system as claimed in claim 24, wherein the allocation unit is operable to allocate the same the subcarriers to a subchannel for all of the spatial channels.

36. A system as claimed in claim 35, wherein the quality measurement for a subchannel is related to the maximum channel gain for the subchannel concerned across all of the spatial channels.

37. A system as claimed in claim 35, wherein the quality measurement for a subchannel is related to an average channel gain for the subchannel concerned across all of the allocation sets.

38. A system as claimed in claim 24, wherein the allocation unit is operable to receive feedback data indicative of subchannel quality measurements.

39. A system as claimed in claim 24, wherein the telecommunications system is a wireless communications system.

40. A system as claimed in claim 24, wherein the telecommunications system is a radio frequency telecommunications system.

41. A system as claimed in claim 40, wherein the radio frequency telecommunications system is an orthogonal frequency division multiple access OFDMA system.

42. A system as claimed in claim 24, wherein the allocation unit is provided by the transmitter terminal.

43. A system as claimed in claim 24, wherein the allocation unit is provided by at least one of the at least one receiver terminal.

44. A system as claimed in claim 24, wherein the quality measurement is a power level measurement.

45. A system as claimed in claim 24, wherein the quality measurement is a SINR (Signal to Interference and Noise Ratio).

46. A system as claimed in claim 24, wherein the transmitter terminal is operable to:
   allocate at least one subchannel to the or each receiver terminal; and
   transmit data to the or each receiver terminal on the subchannel allocated to the receiver terminal concerned.

47. A transmitter terminal for a telecommunications system, the terminal comprising:
   a transmitting unit operable to transmit signals to at least one receiver terminal on subchannels to which subcarriers are allocated; and
   an allocation unit operable to allocate subcarriers to subchannels, and to allocate subchannels to receiver terminals, wherein the allocation unit is operable to:
   a) define a number of spatial channels each of which has a plurality of subchannels associated therewith;
   for each spatial channel:
   b) allocate a set of initial subcarriers among the subcarriers to each subchannel when a subchannnel quality measurement is initialized to zero, wherein the set of initial subcarriers is allocated to give a best subcarrier gain for each subchannel, and wherein the allocated subcarriers are no longer available for allocation to another subchannel and the set of initial subcarriers is less than all the subcarriers;
   c) after allocating the initial subcarriers to each subchannel in step b), detect respective quality measurements for the subchannels;
   d) allocate a further set of unallocated subcarriers among the subcarriers to each of the subchannels associated with the spatial channel, in an order determined by the detected respective quality measurements of the subchannels; and
   e) repeat detection of quality measurements and subsequent allocation of subcarriers until all the subcarriers are allocated.

48. A terminal as claimed in claim 47, comprising at least one transmitter antenna, and wherein the number of spatial channels is related to the number of transmitter antennas.

49. A terminal as claimed in claim 48, wherein the number of spatial channels equals the number of transmitter antennas.

50. A terminal as claimed in claim 47, wherein the number of spatial channels is related to a number of receiver antennas.

51. A terminal as claimed in claim 50, wherein the number of spatial channels equals the number of receiver antennas.

52. A terminal as claimed in claim 47, comprising a plurality of transmit antennas.

53. A terminal as claimed in claim 52, wherein the number of spatial channels equals the lesser of the number of transmitter antennas and the number of receiver antennas.

54. A terminal as claimed in claim 52, wherein the number of spatial channels equals the product of the number of transmitter antennas and a number of receiver antennas.

55. A terminal as claimed in claim 47, wherein the allocation unit is operable to detect quality measurements for each subchannel across a subset of the plurality of spatial channels.

56. A terminal as claimed in claim 47, wherein the allocation unit is operable to detect quality measurements for each subchannel across all of the spatial channels.

57. A terminal as claimed in claim 47, wherein the allocation unit is operable to detect quality measurements for each subchannel for a preselected one of the spatial channels.

58. A terminal as claimed in claim 47, wherein the allocation unit is operable to allocate the same the subcarriers to a subchannel for all of the spatial channels.

59. A terminal as claimed in claim 58, wherein the quality measurement for a subchannel is related to the maximum channel gain for the subchannel concerned across all of the spatial channels.

60. A terminal as claimed in claim 58, wherein the quality measurement for a subchannel is related to an average channel gain for the subchannel concerned across all of the spatial channels.

61. A terminal as claimed in claim 47, wherein the allocation unit is operable to receive feedback data indicative of subchannel quality measurements.

62. A terminal as claimed in claim 47, wherein the telecommunications system is a wireless communications system.

63. A terminal as claimed in claim 47, wherein the telecommunications system is a radio frequency telecommunications system.

64. A terminal as claimed in claim 63, wherein the radio frequency telecommunications system is an orthogonal frequency division multiple access OFDMA system.

65. A terminal as claimed in claim 47, wherein the quality measurement is a power level measurement.

66. A terminal as claimed in claim 47, wherein the quality measurement is a SINR (Signal to Interference and Noise Ratio).

67. A terminal as claimed in claim 47, wherein the transmitter terminal is operable to:

allocate at least one subchannel to a receiver terminal; and
transmit data to that receiver terminal on the subchannel allocated thereto.

* * * * *